United States Patent
Gu et al.

(10) Patent No.: US 9,529,472 B2
(45) Date of Patent: Dec. 27, 2016

(54) TOUCH CIRCUIT AND METHOD FOR DRIVING THE SAME, ARRAY SUBSTRATE, TOUCH DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Xiaofang Gu, Beijing (CN); Ming Hu, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/417,034

(22) PCT Filed: May 29, 2014

(86) PCT No.: PCT/CN2014/078794
§ 371 (c)(1),
(2) Date: Jan. 23, 2015

(87) PCT Pub. No.: WO2015/078162
PCT Pub. Date: Jun. 4, 2015

(65) Prior Publication Data
US 2015/0242040 A1    Aug. 27, 2015

(51) Int. Cl.
*G06F 3/042* (2006.01)
*G06F 3/041* (2006.01)

(52) U.S. Cl.
CPC ............. *G06F 3/0416* (2013.01); *G06F 3/042* (2013.01); *G06F 3/0412* (2013.01); *G06F 3/0428* (2013.01)

(58) Field of Classification Search
CPC .......... G06F 3/20; G06F 3/042; G06F 3/0412; G06F 3/0416; G06F 3/0428
(Continued)

(56) References Cited

U.S. PATENT DOCUMENTS 8,760,409 B2 *  6/2014  Kinoshita ............. G06F 1/3203
345/173
2008/0122804 A1 *  5/2008  Kinoshita ............. G06F 1/3203
345/175
(Continued)

FOREIGN PATENT DOCUMENTS

| CN | 102566836 A | 7/2012 |
|---|---|---|
| CN | 102778982 A | 11/2012 |

(Continued)

OTHER PUBLICATIONS

Office Action in Chinese Patent Application No. 201310628230.8, dated Aug. 25, 2015.
(Continued)

*Primary Examiner* — Prabodh M Dharia
(74) *Attorney, Agent, or Firm* — BakerHostetler LLP

(57) ABSTRACT

By providing a signal transmitting module and a light-controlled module in a touch circuit, and when a light irradiating the light-controlled module changes caused by a touch region of a panel being touched in a scanning cycle, the light-controlled module controls the signal transmitting module to be in a first state in a next scanning cycle, otherwise controls the signal transmitting module to be in a second state in the next scanning cycle, in the first state, the signal transmitting module can transmit a signal transmitted by the first gate line to a signal line as a touch sensing signal, in the second state, the signal transmitting module is in an off-state, so that a signal transmitting line between the first gate line and the signal line is disconnected.

17 Claims, 7 Drawing Sheets

(58) Field of Classification Search
USPC .................. 345/173–175; 327/517; 348/49
See application file for complete search history.

(56) References Cited

U.S. PATENT DOCUMENTS

| | | | |
|---|---|---|---|
| 2009/0146967 A1* | 6/2009 | Ino | G02F 1/133526 345/173 |
| 2009/0161051 A1* | 6/2009 | Fukunaga | G06F 3/0421 349/115 |
| 2009/0273580 A1* | 11/2009 | Ota | G06F 3/0412 345/175 |
| 2009/0284492 A1* | 11/2009 | Chino | G06F 3/0412 345/174 |
| 2010/0026636 A1* | 2/2010 | Jang | G02F 1/13338 345/173 |
| 2010/0253638 A1* | 10/2010 | Yousefpor | G06F 3/0416 345/173 |
| 2011/0007003 A1* | 1/2011 | Jang | G06F 3/0412 345/173 |
| 2011/0050603 A1 | 3/2011 | Park | |
| 2011/0115733 A1* | 5/2011 | Shih | G06F 3/0412 345/173 |
| 2011/0216023 A1* | 9/2011 | Kurokawa | G06F 3/0412 345/173 |
| 2011/0254808 A1* | 10/2011 | Lin | G02F 1/167 345/175 |
| 2011/0285663 A1* | 11/2011 | Lee | G06F 3/044 345/174 |
| 2011/0310057 A1* | 12/2011 | Wang | G02F 1/13338 345/174 |
| 2012/0050206 A1* | 3/2012 | Welland | G06F 3/044 345/174 |
| 2012/0162089 A1* | 6/2012 | Chang | G06F 3/0412 345/173 |
| 2012/0169659 A1* | 7/2012 | Welland | G06F 3/044 345/174 |
| 2012/0327032 A1* | 12/2012 | Jeon | H01L 27/14609 345/175 |
| 2013/0021298 A1 | 1/2013 | Seo et al. | |
| 2013/0063400 A1* | 3/2013 | Ahn | H01L 27/14609 345/175 |
| 2013/0155204 A1* | 6/2013 | Kokubun | G03B 35/02 348/49 |
| 2013/0176072 A1* | 7/2013 | Kim | H03K 17/96 327/517 |
| 2014/0139490 A1* | 5/2014 | Hwang | G06F 3/042 345/175 |
| 2015/0002458 A1* | 1/2015 | Lee | G06F 3/045 345/174 |
| 2015/0301338 A1* | 10/2015 | Van Heugten | G02C 7/04 345/8 |
| 2016/0018918 A1* | 1/2016 | Chen | G06F 3/042 345/175 |

FOREIGN PATENT DOCUMENTS

| | | |
|---|---|---|
| CN | 102955622 A1 | 3/2013 |
| CN | 103176676 A | 6/2013 |
| CN | 103680385 A | 3/2014 |

OTHER PUBLICATIONS

International Search Report and Written Opinion in PCT International Application No. PCT/CN2014/078794, dated Sep. 5, 2014.
Office Action in Chinese Patent Application No. 201310628230.8, dated Mar. 23, 2016.

\* cited by examiner

TOUCH CIRCUIT AND METHOD FOR DRIVING THE SAME, ARRAY SUBSTRATE, TOUCH DISPLAY DEVICE

CROSS-REFERENCE TO RELATED APPLICATION

This application is the U.S. national phase of PCT Application No. PCT/CN2014/078794 filed on May 29, 2014, which claims priority to Chinese Patent Application No. 201310628230.8 filed on Nov. 29, 2013, the disclosures of which are incorporated in their entirety by reference herein.

TECHNICAL FIELD

The present disclosure relates to the field of display technology, in particular to a touch circuit and a method for driving the same, an array substrate, a touch display device.

BACKGROUND

With the development of touch screen technology, each company introduces different touch techniques. Based on principles, the touch techniques mainly have following types: resistive touch screens, capacitive touch screens, infrared touch screens, surface acoustic wave touch screens, electromagnetic touch screens, dispersive signal touch screens, frustrated total internal reflection touch screens, and the like. Based on structure, the touch techniques are divided into following types: out-cell touch screens (double-layer), screens with touch sensor in coverage surface (single-layer), screens with touch sensor on panels (on-cell), screens with touch sensor inside panels (in-cell), and the like.

With technology development, thinner whole modules is a developing trend of touch panels, thus the touch structure develops from out-cell touch sensor to in-cell touch sensor, which may not only achieve the thinner touch panels, but also greatly reduce cost of touch screens.

Recently, touch sensor arranged inside panels (in-cell) are mainly divided into three kinds of techniques: resistive technique, capacitive technique and optical technique. The resistive technique belongs to a low side sensing technique, having a short product life. The capacitive technique is mainly suited for products having a small or medium size, such as 10 inch or below. The optical technique is one major technique of next-generation sensing techniques, which is not limited to panel size and has a relative stable product life.

Therefore, how to achieve the light touch sensing inside panels becomes to a development direction of the touch technology.

SUMMARY

The present disclosure provides a touch circuit and a method for driving the same, an array substrate, a touch display device, so that a light sensing touch function may be achieved in a panel, with characteristics of having a simple structure and being conveniently achieved.

The present disclosure provides technical solutions below:

Embodiments of the present disclosure provide a touch circuit, including:
a signal transmitting module, a first end of which is connected to a first gate line, a second end of which is connected to a signal line, the signal transmitting module having a first state in which the signal transmitting module transmits a signal transmitted by the first gate line to the signal line as a touch sensing signal, and a second state in which the signal transmitting module is in an off-state so as to disconnect a signal transmitting line between the first gate line and the signal line;
a light-controlled module, arranged corresponding to a touch region, and configured to control the signal transmitting module to be in the first state in a next scanning cycle when the touch region is touched in a scanning cycle and the light irradiating the light-controlled module changes, and control the signal transmitting module to be in the second state in the next scanning cycle when the touch region is not touched in the scanning cycle and the light irradiating the light-controlled module does not change, wherein a first end of the light-controlled module is connected to a second gate line, a second end of the light-controlled module is connected to the signal transmitting module.

Alternatively, the signal transmitting module includes:
a reading unit and a switch unit, wherein
the reading unit is configured to read the signal transmitted by the first gate line, a first end of the reading unit is connected to the first gate line, a second end of the reading unit is connected to the switch unit;
the switch unit is in an on-state or in the off-state under the control of the light-controlled module, in the on-state, the switch unit transmits a signal read by the reading unit to the signal line, in the off-state, the switch unit disconnects the signal transmitting line between the reading unit and the signal line, a first end of the switch unit is connected to the reading unit, a second end of the switch unit is connected to the signal line.

Alternatively, the reading unit comprises a read thin film transistor,
the switch unit comprises a switch thin film transistor,
a gate electrode and a source electrode of the read thin film transistor are both connected to the first gate line,
a drain electrode of the read thin film transistor is connected to a source electrode of the switch thin film transistor;
a gate electrode of the switch thin film transistor is connected to the light-controlled module at a controlling node, a drain electrode of the switch thin film transistor is connected to the signal line.

Alternatively, the light-controlled module includes:
a light sensing unit and a storage unit,
wherein the light sensing unit charges the storage unit based on a signal transmitted by the second gate line in the scanning cycle, and controls a voltage outputted to the signal transmitting module based on a light change, the voltage is used to control the signal transmitting module being in the first state or in the second state, a first end of the light sensing unit is connected to the second gate line, a second end of the light sensing unit respectively is connected to the signal transmitting module and a first end of the storage unit at the controlling node, respectively;
a second end of the storage unit is connected to the second gate line or a common electrode line.

Alternatively, the light sensing unit includes:
a photo thin film transistor, wherein a gate electrode and a source electrode of the photo thin film transistor both are connected to the second gate line, a drain electrode of the photo thin film transistor is connected to the controlling node;
the storage unit comprises a first capacitor, a first end of the first capacitor is connected to the controlling node, a second end of the first capacitor is connected to the second gate line or a common electrode line.

Alternatively, the touch sensing signal is a signal generated when touch or light has been sensed.

Alternatively, the touch circuit further includes:

an amplifying circuit, configured to amplify the touch sensing signal transmitted by the signal line, wherein an input end of the amplifying circuit is connected to the signal line, an output end of the amplifying circuit is connected to a processor for determining location information of the touch region.

Embodiments of the present disclosure further provide a method for driving a touch circuit, which is used in the above touch circuit according to embodiments of the present disclosure, wherein the method includes:

a charging step of charging a light-controlled module based on a signal transmitted by a second gate line;

a sensing step of controlling a voltage outputted to a signal transmitting module by the light-controlled module based on a light change caused by whether a touch region is touched;

a reading step of determining the signal transmitting module is in a first state and transmitting a signal transmitted by a first gate line to a signal line, when the voltage outputted to the signal transmitting module from the light-controlled module is higher than an on-state voltage of the signal transmitting module; determining the signal transmitting module is in a second state and disconnecting a signal transmitting line between the first gate line and the signal line, when the voltage outputted to the signal transmitting module from the light-controlled module is lower than the on-state voltage of the signal transmitting module.

Alternatively, in the charging step, the first gate line is in an off-state, the second gate line transmits a high level signal;

in the sensing step, the first gate line and the second gate line are in the off-state;

in the reading step, the first gate line transmits a high level signal, the second gate line is in the off-state.

Alternatively, the charging step and the sensing step are in a same scanning cycle;

the reading step is in a next scanning cycle.

Embodiments of the present disclosure further provide an array substrate. The array substrate may specifically include the above touch circuit according to embodiments of the present disclosure and pixel modules arranged in an array form.

Alternatively, a first gate line and a second gate line are gate lines corresponding to adjacent pixel module rows respectively, or at least one gate line corresponding to another pixel module row exists between the first gate line and the second gate line.

Alternatively, a black matrix is not arranged above the light-controlled module of the array substrate.

Embodiments of the present disclosure further provide a touch display device. The touch display device may specifically include the above array substrate according to embodiments of the present disclosure.

It can be seen from the above-mentioned that, embodiments of the present disclosure provide the touch circuit and the method for driving the same, the array substrate, the touch display device. By providing the signal transmitting module and the light-controlled module in the touch circuit, and when the light irradiating to the light-controlled module changes due to the touch region of the panel being touched in the scanning cycle, the light-controlled module controls the signal transmitting module being in the first state in the next scanning cycle, otherwise controls the signal transmitting module being in the second state in the next scanning cycle, in the first state, the signal transmitting module can transmit the signal transmitted by the first gate line to the signal line as the touch sensing signal, in the second state, the signal transmitting module is in an off-state, so that the signal transmitting line between the first gate line and the signal line is disconnected. Thus the light sensing touch function can be achieved in the panel, with characteristics of having the simple structure and being conveniently achieved.

DETAILED DESCRIPTION

To make the objects, the technical solutions and the advantages of the present disclosure more apparent, the technical solutions of the present disclosure are described clearly and integrally hereinafter in conjunction with the drawings and the embodiments. Obviously, the described embodiments are for illustrative purposes only, but shall not be used to limit the scope of the present disclosure. Based on the described embodiments of the present disclosure, all other embodiments obtained by those skilled in the art belong to the scope of the present disclosure.

Unless specified or limited otherwise, technical terms or scientific terms used herein should be an ordinary meanings which can be understood by those skilled in the art. Terms such as "first" and "second" used in specification and claims of the present disclosure are only for distinguishing different components, but not intended to indicate any sequence, quantity or significance. Similarly, terms such as "an" or "a" used herein refer to "at least one", but not intended to indicate a quantitative limitation. Terms such as "connect" or "couple" used herein may include an electrical connection, regardless directly or indirectly, but not intended to limit to a physical connection or a mechanical connection. Tel such as "above", "below", "left", "right" used herein are only construed to refer to a relative orientation, if an absolution position of the described object changes, then the relative orientation correspondingly changes.

Figure 1:
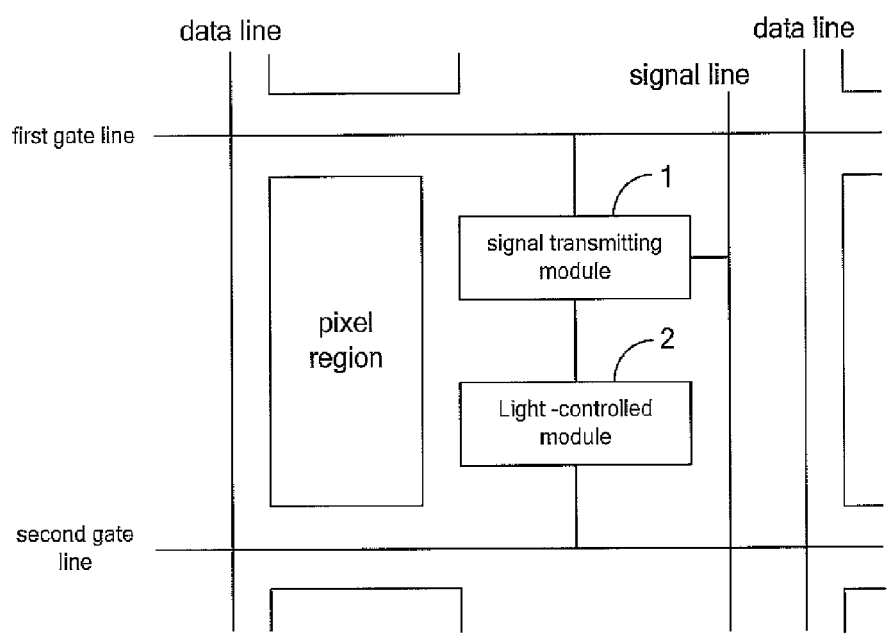
FIG. 1 is a schematic view of a touch circuit according to an embodiment of the present disclosure.

Embodiments of the present disclosure provide a touch circuit, as shown in FIG. 1, the touch circuit may specifically include:

a signal transmitting module 1, in which a first end of the signal transmitting module 1 is connected to a first gate line, a second end of the signal transmitting module 1 is connected to a signal line, the signal transmitting module 1 has a first state and a second state, in the first state, the signal transmitting module 1 can transmit a signal transmitted by the first gate line to the signal line as a touch sensing signal, in the second state, the signal transmitting module 1 is in an off-state, so that a signal transmitting circuit between the first gate line and the signal line is disconnected;

a light-controlled module 2, arranged corresponding to a touch region and configured to control the signal transmitting module 1 being in the first state in a next scanning cycle, when a light irradiating to the light-controlled module 2 changes due to the touch region being touched in a scanning cycle, otherwise control the signal transmitting module 1 being in the second state in the next scanning cycle, in which a first end of the light-controlled module 2 is connected to a second gate line, a second end of the light-controlled module 2 is connected to the signal transmitting module 1.

The touch circuit according to embodiments of the present disclosure may achieve a light sensing touch function in a panel, with characteristics of having a simple structure and being conveniently achieved.

The touch circuit as shown in FIG. 1 only exemplary illustrates devices and functional modules according to embodiments of the present disclosure, in fact, the touch circuit may specifically further include an original pixel device, a thin film transistor, a capacitor and the like in other touch circuits, which are not numerated herein.

Figure 2:
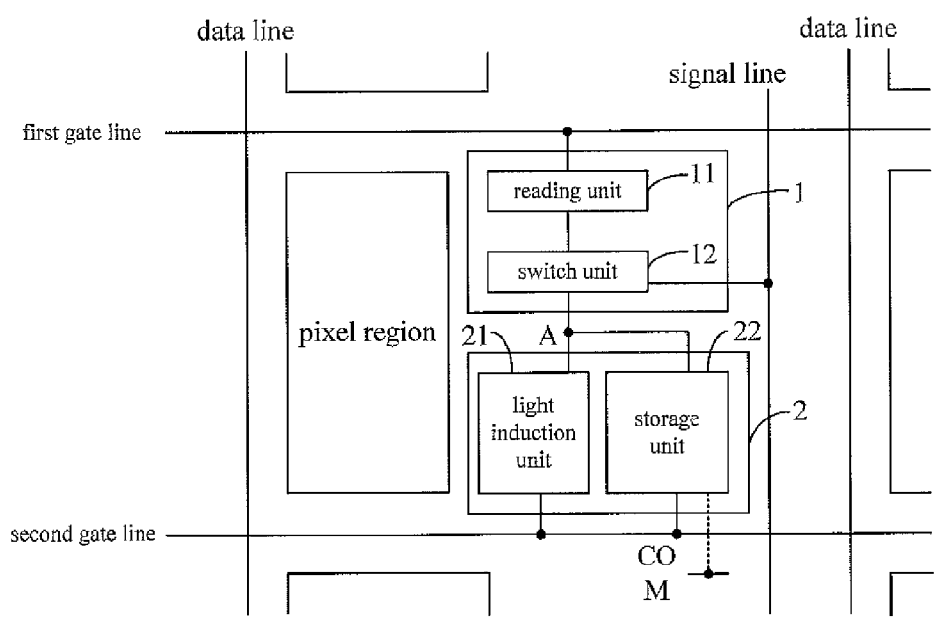
FIG. 2 is a schematic view of a touch circuit according to another embodiment of the present disclosure.

In an embodiment of the present disclosure, as shown in FIG. 2, the signal transmitting module 1 may specifically include:

a reading unit 11 and a switch unit 12, in which
the reading unit 11 is configured to read the signal transmitted by the first gate line, a first end of the reading unit 11 is connected to the first gate line, a second end of the reading unit 11 is connected to the switch unit 12;
the switch unit 12 is in an on-state or in the off-state under the control of the light-controlled module 2, in the on-state, the switch unit 12 transmits a signal read by the reading unit 11 to the signal line, in the off-state, the switch unit 12 disconnects the signal transmitting circuit between the reading unit 11 and the signal line, a first end of the switch unit 12 is connected to the reading unit 11, a second unit of the switch unit 12 is connected to the signal line.

In an embodiment of the present disclosure, also as shown in FIG. 2, the light-controlled module 2 may specifically include:

a light sensing unit 21 and a storage unit 22, in which
the light sensing unit 21 charges the storage unit 22 based on a signal transmitted by the second gate line in the scanning cycle, and controls a voltage outputted to the signal transmitting module 1 based on a light change, the voltage is used to control the signal transmitting module 1 being in the first state or in the second state, a first end of the light sensing unit 21 is connected to the second gate line, a second end of the light sensing unit 21 respectively is connected to the signal transmitting module 1 and a first end of the storage unit 22 at a controlling node A;
a second end of the storage unit 22 is connected to the second gate line or a common electrode line (COM).

Figure 3:
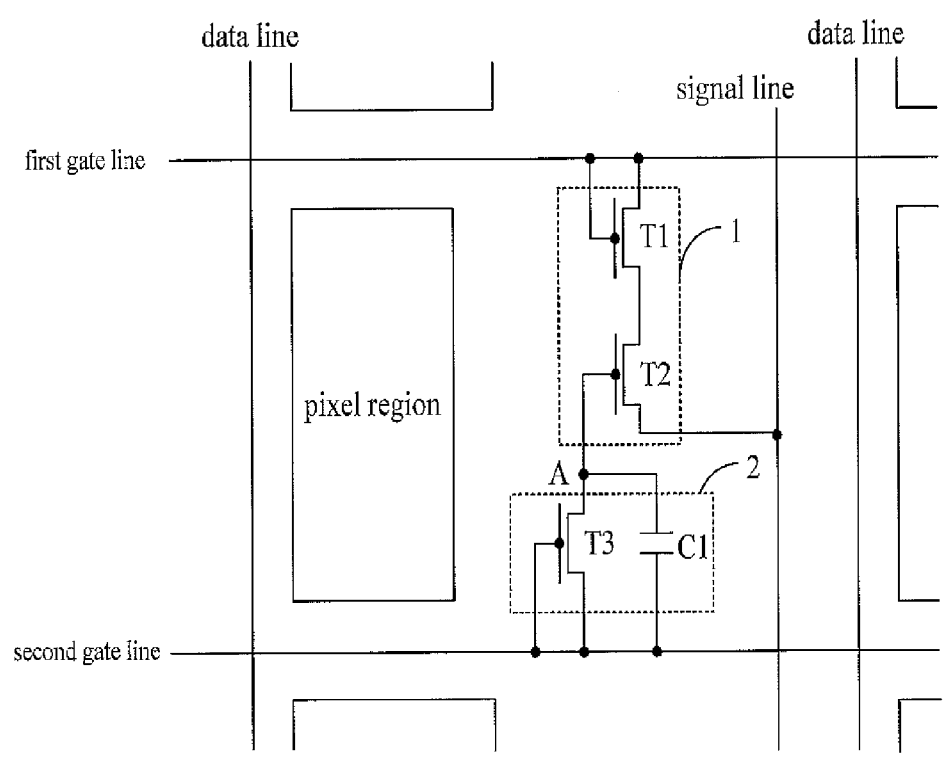
FIG. 3 is a schematic view of a touch circuit according to a yet another embodiment of the present disclosure.

In an embodiment of the present disclosure, as shown in FIG. 3, the reading unit 11 may specifically include:

a read thin film transistor (Read TFT, T1), in which a gate electrode and a source electrode of the read thin film transistor T1 both are connected to the first gate line, a drain electrode of the read thin film transistor T1 is connected to the switch unit 12, i.e., is connected to a source electrode of the switch thin film transistor T2 of the below switch unit 12;

also as shown in FIG. 3, the switch unit 12 may specifically include a switch thin film transistor (switch TFT, T2), in which a gate electrode of the switch thin film transistor T2 is connected to the controlling node A, a drain electrode of the switch thin film transistor T2 is connected to the signal line.

As shown in FIG. 3, the light sensing unit 21 according to an embodiment of the present disclosure may specifically include:

a photo thin film transistor (photo TFT, T3), in which the photo thin film transistor T3 is a light sensing thin film transistor, a gate electrode and a source electrode of the photo thin film transistor T3 both are connected to the second gate line, a drain electrode of the photo thin film transistor T3 is connected to the controlling node A.

Figure 4:
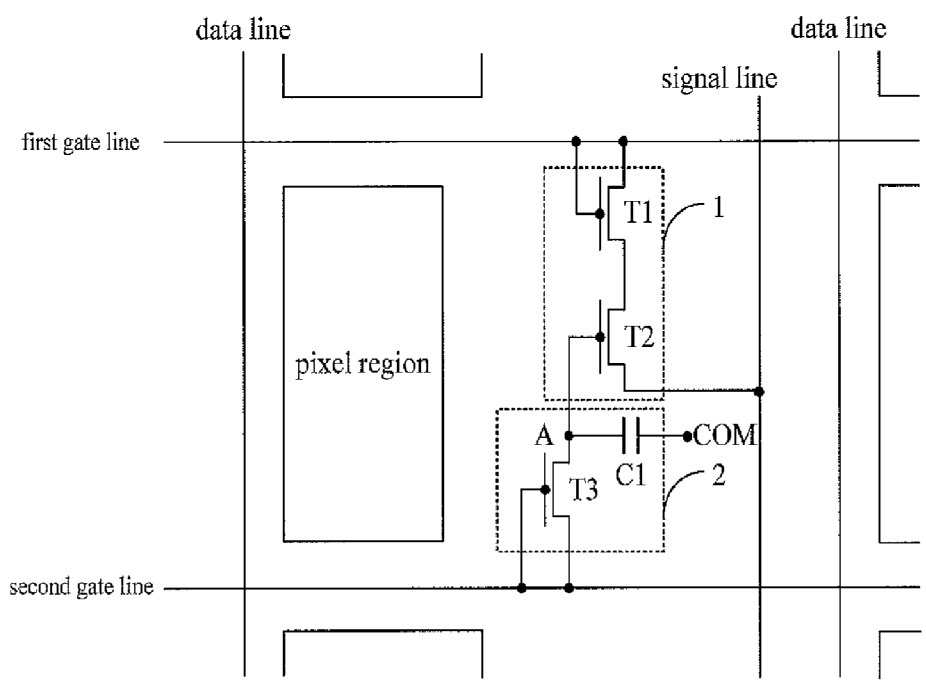
FIG. 4 is a schematic view of a touch circuit according to a still another embodiment of the present disclosure.

As shown in FIG. 3 and FIG. 4, the storage unit 22 according to an embodiment of the present disclosure may specifically include:

a capacitor C1, a first end of the capacitor C1 is connected to the controlling node A, a second end of the capacitor C1 is connected to the second gate line (as shown in FIG. 3) or the common electrode line (as shown in FIG. 4).

The photo thin film transistor T3 according to embodiments of the present disclosure may be specifically formed by a conventional a-Si process. As a-Si is sensitive to lights, when the photo thin film transistor T3 (i.e., a light sensing switch) is irradiated, the concentration of photogenic charge carriers therein increase, which causes an increasing leakage current, under such circumstance, an electric potential of the controlling node A decreases with a relative larger range. However, when there are no lights, the electric potential of the controlling node A decreases with the smallest range, specifically shown as FIG. 5.

As the controlling node A is connected to the signal transmitting module 1 (specifically the controlling node A may connect to the gate electrode of the switch thin film transistor T2), thus the electric potential of the controlling node A may determine whether the signal transmitting module 1 is in the first state (the on-state) or the second state (the off-state). While different states which the signal transmitting module 1 is in, directly lead to a current change of the signal transmitted by the signal line (i.e., whether the signal transmitted by the first gate line transmits to the signal line), thus based on the change of the signal transmitted by the signal line, a processor located subsequently may determine whether the touch region corresponding to the touch circuit is touched, and determine a position information of touch region which has been touched based on a row-coordinate of the gate line and a column-coordinate of the signal line.

In an embodiment of the present disclosure, in order to better achieve different sensing currents resulting from different lights, a light sensing thin film transistor having a large channel may be selected as the photo thin film transistor T3, i.e., in the present embodiment of the present disclosure, the photo thin film transistor T3 may have a channel size larger than those of the read thin film transistor T1 and the switch thin film transistor T2. In addition, in order to not influence the photo thin film transistor T3 to receive lights, a color filter substrate (CF) is not provided with a black matrix (BM) region at a position corresponding to the photo thin film transistor T3, i.e., in the present embodiment, the array substrate is not provided a patterning layer which can block lights, such as a black matrix, on a patterning layer above the light controlled module 2.

The novel light touch techniques referred in embodiments of the present disclosure may specifically be working in two modes: a hand touch mode and a light-pen touch mode (i.e., photo touch mode), i.e., touch sensing signal referred in embodiments of the present disclosure may be signals respectively generated when being touched and being irradiated.

Under the hand touch mode, the touch region arranged in a panel is touched directly by a finger, as the finger blocks external lights when touching, it may be theoretically understood that there are no lights irradiating to the photo thin film transistor when being touched by the finger, at this time, the electric potential of the controlling node A changes little (due to an effect of the capacitor C1 and a small leakage current of the photo thin film transistor T3), which is higher than an on-state voltage of the signal transmitting module 1, so that the signal transmitting module 1 is in the first state, i.e., the on-state. An high level signal transmitted by the first gate line may be transmitted to the signal line via a transmission path established by the signal transmitting module 1 so that the signal transmitted by the signal line has a current change (the signal line itself may transmit no signal or transmit a signal), i.e., an increasing current, a current intensity of the signal collected by the processor located subsequently is shown as the line 1 locating on an upper portion of FIG. 5. When the touch region is not touched, the lights sensed by the photo thin film transistor T3 are ordinary environmental lights, then the photo thin film transistor T3 has a larger leakage current comparing to that of without being irradiated by the lights, thus the electric potential of the controlling node A decreases, which is lower than the on-state voltage of the signal transmitting module 1, at this time, the signal transmitting module 1 is in the off-state, so that the signal transmitting line between the first gate line and the signal line is disconnected, the high level signal transmitted by the first gate line cannot be transmitted to the signal line, so that the signal transmitted by the signal line does not change, i.e., the current does not change, a signal intensity collected by the processor located subsequently is shown as line 2 locating in the middle portion of FIG. 5. The processor located subsequently may determine whether a touch operation of the hand touch mode occurs by comparing the signal intensities respectively shown as the line 1 and the line 2 in FIG. 5, and may determine the position information of the touch region where the touch operation of the hand touch mode occurs, based on information carried by the received signals.

Figure 5:
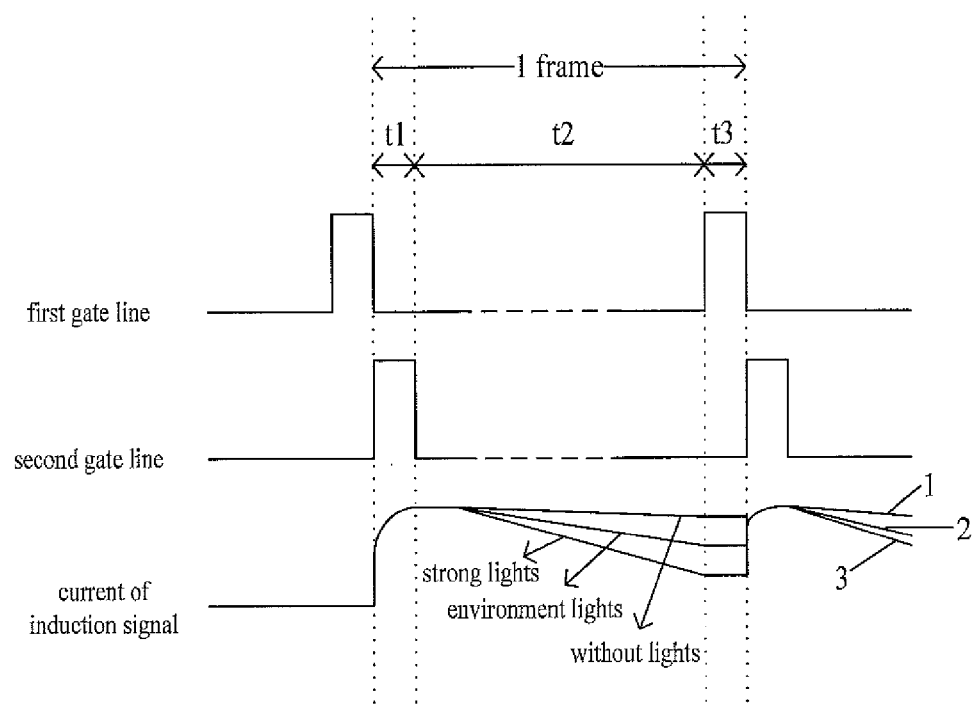
FIG. 5 is a schematic view showing a timing sequence of an inputting signal and a current intensity of an sensing signal in a touch circuit according to an embodiment of the present disclosure.

In the light-pen touch mode (i.e., photo touch mode), the touch may be achieved using a light-pen which can emit qualified lights (for example: a light intensity, a light wavelength, a light type, and the like), as there are lights (for example strong lights) irradiating to the photo thin film transistor T3 when the touch region (i.e., the touch region where the photo thin film transistor T3 locates) is touched by the light-pen, it may be theoretically understood that the photo thin film transistor T3 is irradiated by strong lights when being touched by the light-pen, so that the photo thin film transistor T3 has a significantly increased leakage current, which results in a rapidly decreased electric potential of the controlling node A, so that the signal transmitting module 1 is in a completely off-state, the signal transmitted by the first gate line cannot transmit to the signal line, an intensity of the signal collected by the processor located subsequently may be shown as line 3 in FIG. 5, i.e., only being as an intensity of the signal transmitted by the signal line itself. When there are no lights for touch, the lights sensed by the photo thin film transistor T3 are ordinary environmental lights, then the photo thin film transistor T3 has a lower leakage current comparing to being irradiated by the strong lights, so that the signal transmitting module is in the on-state or a semi-conducting state, thus the signal transmitted by the first gate line transmits to the signal line, with the intensity of the signal collected by the processor located subsequently shown as line 2 in FIG. 5. The processor located subsequently may determine whether a touch operation of the light-pen touch mode (i.e., photo touch mode) occurs by comparing the signal intensities and may determine the position information of the touch region.

It should note that, in embodiments of the present disclosure, by means of selecting the switch thin film transistor T2 having different on-state voltage values, under different touch modes (hand touch mode and light-pen touch mode), the signal transmitting module 1 may be in the different on-states or the off-states by irradiating different intensities of environment lights.

In addition, as the switch thin film transistor T2 has different leakage currents when being in different off-states (such as an ordinary off-state that the controlling node A has a residual positive voltage, and a completed off-state that the controlling node A has a negative voltage), thus in other embodiments of the present disclosure, such characteristic of the switch thin film transistor T2 may be utilized to achieve the determination of the touch operation based on the sensing current change.

In the light sensing module according to embodiments of the present disclosure, the capacitor C1 is used as the storage unit 22, as shown in FIG. 3, which may not only connect one end thereof to the second gate line, but also can connect one end thereof to the common electrode (COM) as shown in FIG. 4, however when being specifically achieved, a capacitance of the capacitor C1 is also important, if the capacitance of the capacitor C1 is very small, the electric potential of the control node A rapidly decreases to a low electric potential, which may lead to an electric potential of the gate electrode of the switch thin film transistor T2 rapidly decrease to a low electric potential, so that the sensing signals collected by the processor located subsequently are same regardless with or without the touch, being not able to be distinguished; while if the capacitance of the capacitor C1 is very large, an aperture ratio of an pixel is influenced. Therefore, various factors should be considered integrally when designing.

In embodiments of the present disclosure, the first gate line and the second gate line may specifically be two adjacent gate lines, and one of them may be a gate line of a pixel module row where the touch circuit locates according to embodiments of the present disclosure, i.e., in embodiments of the present disclosure, the first gate line and the second gate line may be lines corresponding to adjacent pixel module rows respectively.

In another embodiment of the present disclosure, the first gate line and the second gate line may be two non-adjacent gate lines, i.e., at least one gate line corresponding to another pixel module row may exist between the first gate line and the second gate line according to embodiments of the present disclosure, as long as the second gate line may charge the light-controlled module, and the first gate line may provide the high level signal.

In addition, the light sensing circuit according to embodiments of the present disclosure (including the signal transmitting module and the light-controlled module), may be arrange in each pixel module of a touch panel; or a plurality of rows of pixels and/or a plurality of columns of pixels may be provided with one light sensing circuit. As each of the pixel module has a relative smaller area comparing with that of the touch panel, thus one light sensing circuit being arranged in the plurality of rows of pixels, the plurality of columns of the pixels, has a relative little influence to touch sensing, which may reduce cost for manufacturing the touch panel.

In order to make the processor located subsequently being able to accurately determining changes of the sensing signal, in an embodiment of the present disclosure, the touch circuit according to embodiments of the present disclosure may further include:

an amplifying circuit, configured to amplify the touch sensing signal transmitted by the signal line, in which an input end of the amplifying circuit is connected to the signal line, an output end of the amplifying circuit is connected to a processor for determining a location information of the touch region.

Figure 6:
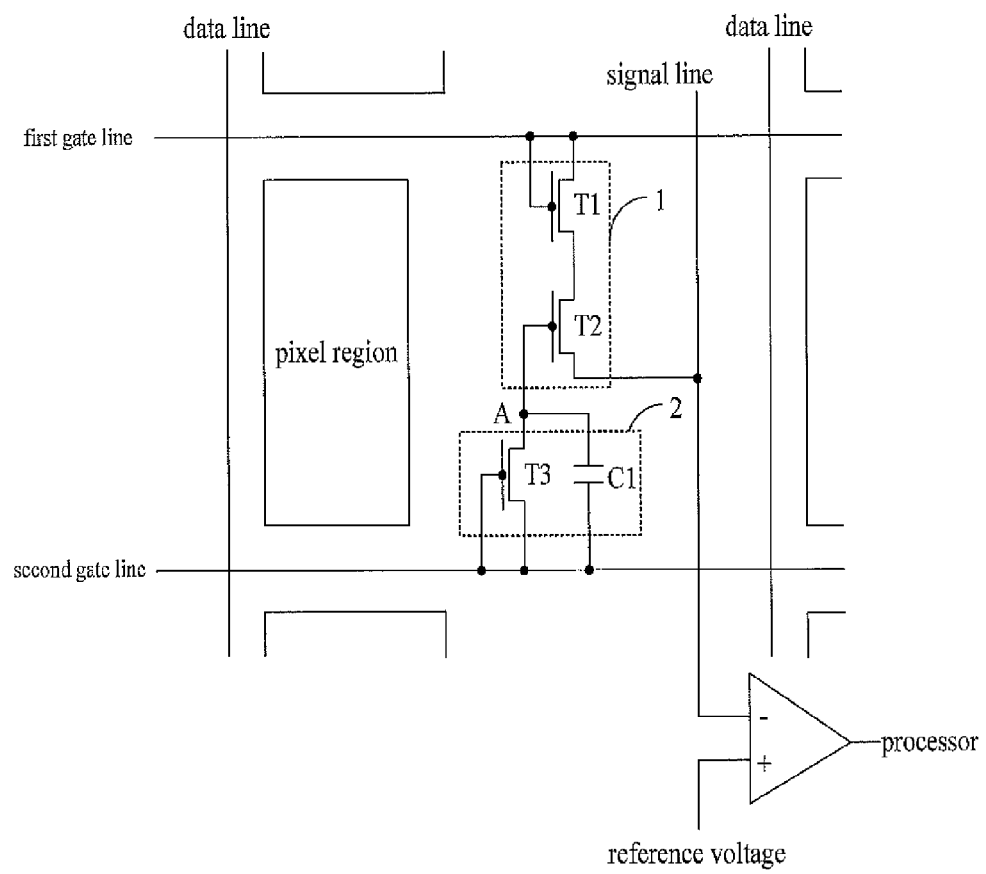
FIG. 6 is a schematic view of a touch circuit according to a further another embodiment of the present disclosure.

In an embodiment of the present disclosure, as shown in FIG. 6, the amplifying circuit according to embodiments of the present disclosure may specifically be a amplifier, in which a negative input end (−) of the amplifier is connected to the signal line, a positive input end (+) of the amplifier is connected to a reference voltage, an output end of the amplifier is connected to a processor, so as to converse a current signal of the signal line into a voltage signal which is input to the processor located subsequently for data process.

Figure 7:
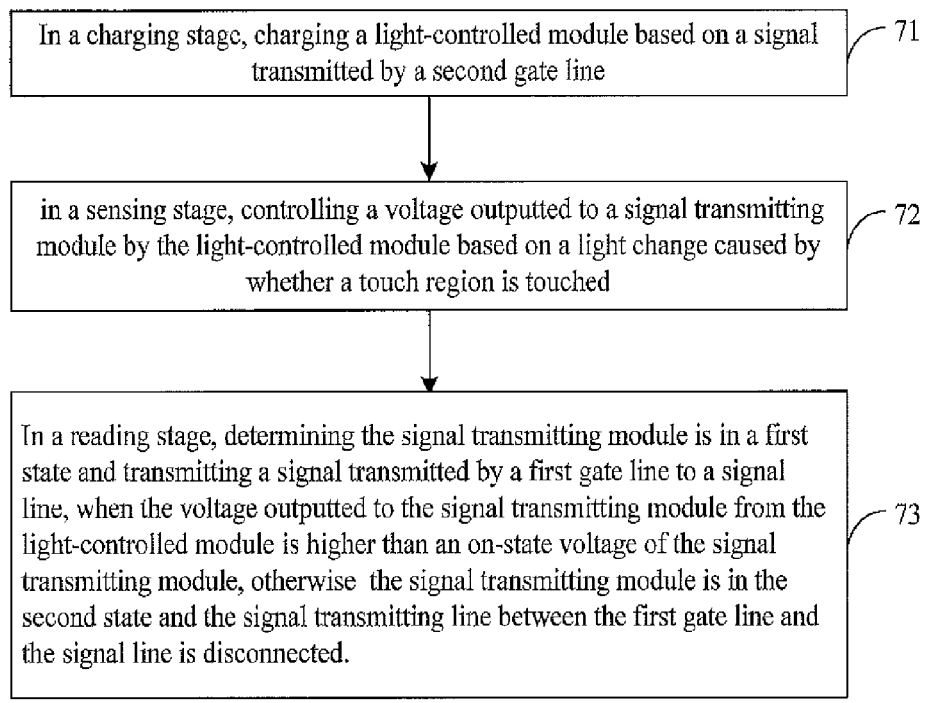
FIG. 7 is a schematic view of a process showing a method for driving a touch circuit according to embodiments of the present disclosure.

Embodiments of the present disclosure further provide a method for driving a touch circuit, which is used in above the touch circuit according to embodiments of the present disclosure, as shown in FIG. 7, the method includes:

Step 71, in a charging stage, charging the light-controlled module 2 based on a signal transmitted by the second gate line;

Step 72, in an sensing stage, controlling the voltage outputted to the signal transmitting module 1 by the light-controlled module 2 based on a light change caused by whether a touch region is touched;

Step 73, in a reading stage: determining the signal transmitting module is in the first state and transmitting the signal transmitted by the first gate line to the signal line, when the voltage outputted to the signal transmitting module 1 from the light-controlled module 2 is higher than an on-state voltage of the signal transmitting module; otherwise the signal transmitting module is in the second state and the signal transmitting line between the first gate line and the signal line is disconnected.

Specific implementing process of using a pixel driving method according to embodiments of the present disclosure in the touch circuit as shown in FIG. 3 is specifically described in conjunction with FIG. 5:

In the charging stage (t1), i.e., in a first scanning cycle, the first gate line is in the off-state, the second gate line is in the on-state and transmits a high level signal, at this time, the photo thin film transistor T3 is in the on-state, the high level signal transmitted by the second gate line is transmitted to the controlling node A for charging the capacitor C1, as the first gate line is in the off-state, then the read thin film transistor T1 is in the off-state.

In the sensing stage (t2), being also in the first scanning cycle, the first gate line and the second gate line are in the off-state, if the photo thin film transistor T3 is not irradiated by lights, then the electric potential of the controlling node A maintains at a high electric potential; if the photo thin film transistor T3 is irradiated by environment lights, then the electric potential of the controlling node A decreases slowly; if the photo thin film transistor T3 is irradiated by strong lights, then the electric potential of the controlling node A decreases rapidly.

In the reading stage (t3), i.e., in a second scanning cycle, the first gate line transmits the high level signal, the second gate line is in the off-state, at this time, if the electric potential of the controlling node A is higher than the on-state voltage of the switch thin film transistor T2, then the high level signal transmitted by the first gate line is transmitted to the signal line via read thin film transistor T1 and the switch thin film transistor T2; if the electric potential of the controlling node A is lower than the on-state voltage of the switch thin film transistor T2, then the high level signal transmitted by the first gate line cannot be transmitted to the signal line.

In embodiments of the present disclosure, the processor (MCU) located subsequently may determine whether the touch operation occurs in the touch region based on a voltage change of received sensing signal.

In addition, in the present disclosure, the charging stage, the sensing stage (t2) and the reading stage (t3) may be different stages within one frame.

Embodiments of the present disclosure further provide an array substrate, which specifically includes the above touch circuit according to embodiments of the present disclosure and pixel modules arranged in an array.

In the touch circuit according to embodiments of the present disclosure, the first gate line and the second gate line may specifically gate lines corresponding to adjacent pixel module rows in the array substrate, or at least one gate line corresponding to another pixel module row exists between the first gate line and the second gate line.

In an embodiment of the present disclosure, a light-blocking patterning layer, such as a black matrix, is not arranged above the light-controlled module 2 of the array substrate.

Embodiments of the present disclosure further provide a touch display device, which may specifically include the above array substrate according to embodiments of the present disclosure.

The touch display device may specifically be devices such as a liquid crystal panel, a liquid crystal television, a liquid crystal display, an OLED (organic light emitting diode) panel, an OLED display, a plasma display, and an electric paper.

It can be seen from the above-mentioned that, embodiments of the present disclosure provide the touch circuit and the method for driving the same, the array substrate, the touch display device. By providing the signal transmitting module and the light-controlled module in the touch circuit, and when the light irradiating to the light-controlled module changes caused by the touch region of the panel being touched in the scanning cycle, the light-controlled module controls the signal transmitting module being in the first state in the next scanning cycle, otherwise controls the signal transmitting module being in the second state in the next scanning cycle, in the first state, the signal transmitting module can transmit the signal transmitted by the first gate line to the signal line as the touch sensing signal, in the second state, the signal transmitting module is in an off-state, so that the signal transmitting line between the first gate line and the signal line is disconnected. Thus the light sensing touch function can be achieved in the panel, with characteristics of having the simple structure and being conveniently achieved.

The above are merely the preferred embodiments of the present disclosure. It should be noted that, a person skilled in the art may further make improvements and modifications without departing from the principle of the present disclosure, and these improvements and modifications shall also be considered as the scope of the present disclosure.

What is claimed is:

1. A touch circuit, comprising:
   a signal transmitting module, a first end of which is connected to a first gate line, a second end of which is connected to a signal line, the signal transmitting module having a first state in which the signal transmitting module transmits a signal transmitted by the first gate line to the signal line as a touch sensing signal, and a second state in which the signal transmitting module is in an off-state so as to disconnect a signal transmitting line between the first gate line and the signal line;
   a light-controlled module, arranged corresponding to a touch region, and configured to control the signal transmitting module to be in the first state in a next scanning cycle when the touch region is touched in a scanning cycle and the light irradiating the light-controlled module changes, and control the signal transmitting module to be in the second state in the next scanning cycle when the touch region is not touched in the scanning cycle and the light irradiating the light-controlled module does not change, wherein a first end of the light-controlled module is connected to a second gate line, a second end of the light-controlled module is connected to the signal transmitting module;
   wherein the signal transmitting module comprises:
   a reading unit and a switch unit, wherein
   the reading unit is configured to read the signal transmitted by the first gate line, a first end of the reading unit is connected to the first gate line, a second end of the reading unit is connected to the switch unit;
   the switch unit is in an on-state or in the off-state under the control of the light-controlled module, in the on-state, the switch unit transmits the signal read by the reading unit to the signal line, in the off-state, the switch unit disconnects the signal transmitting line between the reading unit and the signal line, a first end of the switch unit is connected to the reading unit, a second end of the switch unit is connected to the signal line;
   wherein the light-controlled module comprises:
   a light sensing unit and a storage unit, wherein
   the light sensing unit charges the storage unit based on a signal transmitted by the second gate line in the scanning cycle, and controls a voltage outputted to the signal transmitting module based on a light change, the voltage is used to control the signal transmitting module to be in the first state or in the second state, a first end of the light sensing unit is connected to the second gate line, a second end of the light sensing unit respectively is connected to the signal transmitting module and a first end of the storage unit at a controlling node, respectively;
   a second end of the storage unit is connected to the second gate line or a common electrode line.

2. The touch circuit according to claim 1, wherein
   the reading unit comprises a read thin film transistor,
   the switch unit comprises a switch thin film transistor,
   a gate electrode and a source electrode of the read thin film transistor are both connected to the first gate line, and a drain electrode of the read thin film transistor is connected to a source electrode of the switch thin film transistor;
   a gate electrode of the switch thin film transistor is connected to the light-controlled module at a controlling node, and a drain electrode of the switch thin film transistor is connected to the signal line.

3. The touch circuit according to claim 1, wherein the light sensing unit comprises:
   a photo thin film transistor, a gate electrode and a source electrode of the photo thin film transistor both are connected to the second gate line, and a drain electrode of the photo thin film transistor is connected to the controlling node;
   the storage unit comprises a first capacitor, a first end of the first capacitor is connected to the controlling node, a second end of the first capacitor is connected to the second gate line or a common electrode line.

4. The touch circuit according to claim 3, wherein the gate electrode and the source electrode of the photo thin film transistor both are directly connected to the second gate line, and the drain electrode of the photo thin film transistor is connected to the controlling node;
   the first end of the first capacitor is connected to the controlling node, the second end of the first capacitor is directly connected to the second gate line or the common electrode line.

5. The touch circuit according to claim 4, wherein the reading unit comprises a read thin film transistor,
   the switch unit comprises a switch thin film transistor,
   a gate electrode and a source electrode of the read thin film transistor are both directly connected to the first gate line, and a drain electrode of the read thin film transistor is connected to a source electrode of the switch thin film transistor;
   a gate electrode of the switch thin film transistor is directly connected to the drain electrode of the photo thin film transistor at the controlling node, and the drain electrode of the switch thin film transistor is directly connected to the signal line.

6. The touch circuit according to claim 1, wherein the touch sensing signal is a signal generated when touch or light has been sensed.

7. The touch circuit according to claim 1, further comprising:
   an amplifying circuit, configured to amplify the touch sensing signal transmitted by the signal line,
   wherein an input end of the amplifying circuit is connected to the signal line, an output end of the amplifying circuit is connected to a processor for determining location information of the touch region.

8. A method for driving a touch circuit, used in the touch circuit according to claim 1, wherein the method comprises:
   a charging step of charging a light-controlled module based on a signal transmitted by a second gate line;
   a sensing step of controlling a voltage outputted to a signal transmitting module by the light-controlled module based on a light change caused by whether a touch region is touched; and
   a reading step of determining that the signal transmitting module is in a first state and transmitting a signal transmitted by a first gate line to a signal line when the voltage outputted to the signal transmitting module from the light-controlled module is higher than an on-state voltage of the signal transmitting module; and determining the signal transmitting module is in a second state and disconnecting a signal transmitting line between the first gate line and the signal line when the voltage outputted to the signal transmitting module from the light-controlled module is lower than the on-state voltage of the signal transmitting module.

9. The method according to claim 8, wherein in the charging step, the first gate line is in an off-state, the second gate line transmits a high level signal;

in the sensing step, the first gate line and the second gate line are in the off-state;

in the reading step, the first gate line transmits a high level signal, the second gate line is in the off-state.

10. The method according to claim 8, wherein the charging step and the sensing step are in a same scanning cycle; and the reading step is in a next scanning cycle.

11. An array substrate, comprising the touch circuit according to claim 1 and pixel modules arranged in an array form.

12. The array substrate according to claim 11, wherein a first gate line and a second gate line are gate lines corresponding to adjacent pixel module rows respectively, or at least one gate line corresponding to another pixel module row exists between the first gate line and the second gate line.

13. The array substrate according to claim 11, wherein a black matrix is not arranged above the light-controlled module of the array substrate.

14. A touch display device, comprising the array substrate according to claim 11.

15. The touch display device according to claim 14, wherein a first gate line and a second gate line are gate lines corresponding to adjacent pixel module rows respectively, or at least one gate line corresponding to another pixel module row exists between the first gate line and the second gate line.

16. The touch display device according to claim 14, wherein a black matrix is not arranged above the light-controlled module of the array substrate.

17. The touch circuit according to claim 1, wherein the first end of the light sensing unit is directly connected to the second gate line;

the second end of the storage unit is directly connected to the second gate line or the common electrode line.

* * * * *